3,330,868
METHOD OF MAKING PHOSPHONIUM METHYLENE PHOSPHORANES
Daniel W. Grisley, Jr., Lexington, Mass., assignor to Monsanto Research Corporation, St. Louis, Mo., a corporation of Delaware
No Drawing. Filed Oct. 14, 1963, Ser. No. 316,148
10 Claims. (Cl. 260—606.5)

This invention relates to a method of producing phosphorus compounds and, more particularly, provides a novel method of producing phosphonium methylenephosphoranes.

The phosphonium methylenephosphoranes are mesomeric organophosphorus compounds in which two tri-substituted phosphorus atoms are attached to the same carbon atom, which have been provided as described in the application of Clifford N. Matthews, S.N. 154,874, filed Nov. 24, 1961, and now abandoned. These compounds can be represented by a formula corresponding to the stated nomenclature in which one P atom is doubly-bonded to the central carbon atom (phosphorane) and one is singly-bonded to it and charged (phosphonium), as follows:

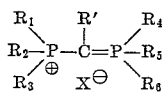

where each R (each of $R_1$, $R_2$, $R_3$, $R_4$, $R_5$ and $R_6$) is hydrocarbon free of aliphatic unsaturation and containing from 1 to 18 carbon atoms, R' is selected from the class consisting of H and hydrocarbon as defined for R, and X is an anion. Being mesomeric, the stated compounds are capable of resonance, which may be represented by the formulas:

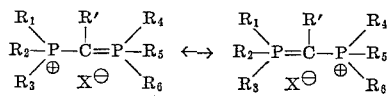

More accurately, the stated mesomeric compounds are represented by a formula showing the charge distributed between the two P atoms and showing the equivalence of the two P atoms, as follows:

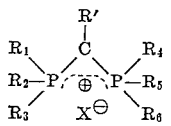

Preparation of the stated mesomeric compounds can be accomplished as disclosed in the stated application of Clifford N. Matthews, by dehydrohalogenation of a methylene diphosphonium dihalide, for example as illustrated by the equation

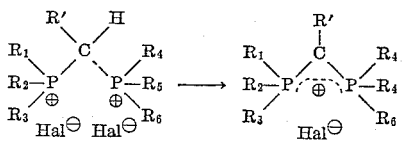

where each R is as defined above, R' is as defined above, and each $Hal^\ominus$ is a halide ion. The dehydrohalogenation can be accomplished by contacting the mesomeric salt with a suitable base, such as sodium carbonate.

The methylene diphosphonium dihalides used as stated for synthesis of the phosphonium methylenephosphorane halides can be prepared by reaction of a tri-substituted phosphine with an alkylidene-1,1-dihalide: for example, by addition of triphenylphosphine to methylene dibromide:

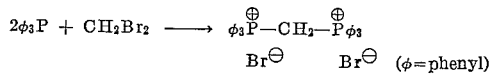

However, the stated reaction is accompanied by a competing reaction, in which an alkyl phosphonium monobromide is formed. One-to-one addition of the reactants forms a mono-salt, bromomethylphosphonium bromide, as illustrated by the equation:

It is convenient to use excess methylene dibromide in conducting this reaction. A solvent is needed to keep the reaction mixture fluid enough to stir, and excess methylene dibromide provides one which introduces no extraneous materials into the reaction. With excess methylene dibromide present, however, the loss of starting material to the competing reaction is substantial: at a ratio of one mole of the phosphine to two of methylene dibromide, about twice as many moles of mono-salt are formed as of di-salt. These considerable amounts of undesired mono-salt byproducts then have to be separated from the di-salt, to recover the methylene diphosphonium dibromide in a state of suitable purity to use for making the mesomeric phosphonium methylenephosphorane bromide by dehydrohalogenation.

As will be evident from the foregoing, thus, the preparation of a mesomeric phosphonium methylenephosphorane salt from a tri-substituted phosphine and an alkylidene-1,1-dihalide, with intermediate isolation of the methylene diphosphonium dihalide precursor of the mesomeric salt, is accordingly inconvenient.

It is an object of this invention to provide an improved method of producing a phosphonium methylenephosphorane halide.

A particular object of this invention is to provide an improved, direct method of producing a mesomeric phosphonium methylenephosphorane halide.

These and other objects will become evident upon consideration of the following specification and claims.

It has now been found that effective dehydrohalogenation of a methylene diphosphonium dihalide and recovery of the dehydrohalogenation products uncontaminated by alkylphosphonium monohalide admixed with the dihalide can be accomplished in a single step, by introducing a solution of the mixture of the said monohalide and dihalide into a bed of a solid basic chromatographic adsorbent and eluting the absorbent bed.

Accordingly, this invention provides an advantageous method for preparation of a phosphonium methylenephosphorane halide, comprising simultaneous conversion of a methylene diphosphonium dihalide thereto and separation of the stated product from alkylphosphonium monohalide originally admixed with the said dihalide, by passing the mixture into a bed of adsorbent, as stated, and eluting the phosphorane from the bed.

As will be evident from the foregoing discussion, the stated method provides a useful, novel procedure for preparing the phosphonium methylenephosphoranes, starting from a tri-substituted phosphine and an alkylidene-1,1-dihalide. For the separate steps of isolating the methylene diphosphonium dihalide from the resulting reaction product mixture, and thereafter dehydrohalogenating the dihalide to provide the mesomeric salt and recovering this, it substitutes a single step which accomplishes the conversion and the isolation all at once. Moreover, the yields of the mesomeric salt calculated on disalt treated are advantageously high.

The effectiveness of the presently provided method is surprising. The "basic" adsorbents which can be used to effect the stated conversion and separation include the so-called "neutral" aluminum oxide, which is only very slightly alkaline. On the other hand, when the adsorbent is weakly acidic, as exemplified by silica gel, under appropriate conditions the dihalide and monohalide in the mixture may be chromatographically separated, but dehydrohalogenation does not occur. The separated dihalide must be dehydrohalogenated and the phosphonium methylenephosphorane recovered in a separate step, as in the previously described method. Indeed, the above-stated discovery of the dehydrohalogenating effect of neutral aluminum oxide adsorbent on a methylene diphosphonium dihalide was made in the course of an attempt to produce chromatographic separation of the dihalide and monohalide salts. Unexpectedly, the dehydrohalogenated product was obtained, while at the same time, the monohalide salt was held back and separated.

In practicing the method of the invention, the phosphonium methylene phosphorane halides which may be produced are illustrated by triphenylphosphonium methylenetriphenylphosphorane bromide,
triphenylphosphonium methylenetriphenylphosphorane chloride,
triphenylphosphonium methylenetriphenylphosphorane iodide,
tri-p-tolylphosphonium methylenetri-p-tolylphosphorane bromide,
tri-p-tolylphosphonium methylenetri-p-tolylphosphorane fluoride,
triphenylphosphonium ethylidenetriphenylphosphorane bromide,
trimethylphosphonium methylenetrimethylphosphorane chloride,
tributylphosphonium methylenetributylphosphorane bromide,
tributylphosphonium methylenetributylphosphorane iodide,
tricyclohexylphosphonium methylenetricyclohexylphosphorane bromide,
tribenzylphosphonium methylenetribenzylphosphorane bromide,
dibenzylphenylphosphonium methylenedibenzylphenylphosphorane iodide,
triphenylphosphonium propylidenetriphenylphosphorane bromide,
triphenylphosphonium octadecylidenetriphenylphosphorane chloride,
triphenylphosphonium propylidenetriphenylphosphorane bromide,
trinaphthylphosphonium methylenetrinaphthylphosphorane bromide,
tribiphenylylphosphonium methylenetribiphenylylphosphorane iodide, and so forth.

The method of the invention is applicable to a wide variety of mixtures of a methylene diphosphonium dihalide with an alkylphosphonium halide. The method is particularly valuable, used in conjunction with the reaction of a tri-substituted phosphine with an alkylidene-1,1-dihalide to provide such a mixture. In this reaction, the alkylidene dihalide may be methylene dichloride, dibromide or diiodide; the dibromide is especially convenient and preferred. Higher molecular weight alkylidene-1,1-dihalides wherein the alkylidene chain is hydrocarbon of up to 18 C atoms, free of aliphatic (olefinic or acetylenic) unsaturation, such as 1,1-dibromoethane, 1,1-dibromopropane, 1,1-dibromo-2-methylpropane, 1,1-dichloropropane, 1,1-dibromooctane, 1,1-dibromooctadecane and the like, may also be employed. Exemplary of the tri-substituted phosphines useful in this connection are those having hydrocarbon substituents of up to 18 carbon atoms, free of aliphatic unsaturation, such as triphenylphosphine, tritolylphosphine, trinaphthylphosphine,
tribiphenylylphosphine, triterphenylylphosphine,
tris(t-butylphenyl)phosphine, tris(p-octylphenyl)phosphine,
trixylylphosphine, tris(diisopropylphenyl)phosphine, tributylphosphine,
trimethylphosphine, trioctylphosphine, butyldiphenyl phosphine, and the like.

Thus, referring to the mixtures adapted for production of isolated phosphonium methylene phosphoranes in accordance with this invention, the methylene diphosphonium dihalide component thereof will be of the formula:

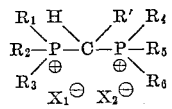

where each R (each of $R_1$, $R_2$, $R_3$, $R_4$, $R_5$ and $R_6$) is a hydrocarbon radical, R' is a substituent selected from H and aliphatic hydrocarbon radicals, each X (each of $X_1$ and $X_2$) is a halogen atom having an atomic weight of between 30 and 130, and each said hydrocarbon radical contains up to 18 carbon atoms and is free of aliphatic unsaturation. As will be evident from the stated formula, by references to methylene diphosphonium dihalides herein are meant alkylidene-1,1-diphosphonium dihalides, wherein the alkylidene group may be methylene or a higher saturated aliphatic hydrocarbon divalent radical. Exemplary of such methylene diphosphonium dihalides, available by reaction of an alkylidene-1,1-dihalide with a phosphine, as stated above, are methylene bis(triphenylphosphonium bromide),
methylene bis(triphenylphosphonium chloride),
methylene bis(triphenylphosphonium iodide),
methylene bis(triphenylphosphonium) bromide chloride,
methylene bis(triphenylphosphonium) bromide fluoride,
methylene bis(tri-p-tolylphosphonium bromide),
methylene bis(tri-p-tolylphosphonium chloride),
methylene bis(trixylylphosphonium bromide),
methylene bis(tri-n-butylphenylphosphonium bromide),
methylene bis(trioctadecylphosphonium) bromide chloride,
ethylidene bis(triethylphosphonium bromide),
propylidene bis(triisobutylphosphonium fluoride),
octylidene bis(tribiphenylylphosphonium bromide),
butylidene bis(tribenzylphosphonium bromide),
propylidene bis(tributylphosphonium chloride),
cyclohexylmethylene bis(triphenylphosphonium chloride),
methylene bis(trimethylphosphonium bromide),
methylene bis(diethylphenylphosphonium bromide),
methylene bis(tricyclohexylphosphonium iodide),
methylene bis(tris[octylnaphthyl]phosphonium bromide),
methylene triphenylphosphonium tributylphosphonium dibromide, and so forth.

Exemplary of alkylphosphonium halides which may be admixed with such methylene diphosphonium dihalides in mixtures subjected to the process of this invention are monohalides which may be 1-haloalkylphosphonium halides such as (bromomethyl)triphenylphosphonium bromide,
(1-bromoethyl)triphenylphosphonium bromide,
(bromoethyl)tributylphosphonium bromide,
(bromomethyl)trixylylphosphonium bromide,
(chloromethyl)triphenylphosphonium chloride,
(bromoethyl)triphenylphosphonium bromide,
(chloromethyl)tricyclohexylphosphonium bromide,
(chloromethyl)trinaphthylphosphonium bromide,
(1-bromopropyl)triphenylphosphonium bromide,
[bromo(cyclohexyl)methyl]triphenylphosphonium iodide, (chloromethyl)triphenylphosphonium iodide,
(1-bromo-2,2-diphenylethyl)triphenylphosphonium bromide,
(chloromethyl)tribenzylphosphonium chloride,
(bromomethyl)diethylphenylphosphonium bromide,
(bromomethyl)tris(octylnaphthyl)phosphonium iodide,
(bromomethyl)tri-p-tolylphosphonium bromide,
(1-bromooctyl)triphenylphosphonium bromide,
(chloromethyl)tris(butylphenyl)phosphonium bromide,
and the like.

The reaction mixture obtained from reaction of an alkylidene dihalide and a tri-substituted phosphine may also contain an alkyl phosphonium halide such as methyltriphenylphosphonium bromide, of the formula

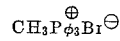

in which the halogen substituent of haloalkylphosphonium halides as above described is replaced by hydrogen, particularly after contact with a proton donor such as an alkyl alcohol, which may be employed in working up the reaction mixture. Exemplary of such alkylphosphonium halides are methyltriphenylphosphonium bromide, methyltri-p-tolylphosphonium bromide, methyltris(t-butylphenyl)phosphonium bromide, ethyltriphenylphosphonium bromide, methyltrixylyl phosphonium chloride, methyltrinaphthylphosphonium bromide, methyltriphenylphosphonium iodide, octyltriphenylphosphonium bromide, isobutyltribenzylphosphonium bromide, methyltributylphosphonium bromide and the like. References to alkyl phosphonium halides, monohalides and mono-salts herein are intended to include alkylphosphonium monohalides selected from 1-haloalkylphosphonium halides and alkylphosphonium halides in which the alkyl groups are hydrocarbon radicals, and the mixtures of such alkylphosphonium halides with methylene diphosphonium dihalides which may be processed in accordance with this invention may include one or both such kinds of alkylphosphonium halides.

The proportions of dihalide and monohalide in mixtures of the stated salts may vary widely. As low as 1% by weight of the monohalide may be separated by the method of the invention, or the mixture may contain more than twice as much monohalide as dihalide, with effective conversion to the phosphonium methylenephosphorane salt and separation by the presently provided method; indeed, the ratio may be as high as 90 parts by weight monohalide to 10 parts dihalide.

For provision of the mixtures of methylene diphosphonium dihalides and alkylphosphonium halides by reaction of an alkylidene dihalide with a tri-substituted phosphine, the latter reactants are contacted to produce reaction. Generally conducting the reaction, temperature used may vary from down to where the reaction mixture is barely liquid up to any temperature below the decomposition temperature of the mixture components. The rapidity of the reaction will vary with the reactants chosen. In some cases, the reaction may be exothermic, and require cooling, diluents or the like to moderate its violence. Other pairs of reactants may not react completely until after refluxing at elevated temperatures. Suitable temperatures for carrying out the reaction are usually between 0° and 200° C. and, in most cases, in the range of 25–100° C. Pressure variation may also be utilized to facilitate conducting the reaction, for example, by carrying out the reaction in a pressure-resistant vessel under autogenous pressure and at elevated temperatures. The time required to accomplish the reaction depends on functional factors such as reactivity of the reactants, temperature of reaction, and so forth. Solvents may be employed, and the reaction may be promoted by use of highly polar solvents such as nitromethane, acetonitrile, dimethylformamide, dimethylsulfoxide or the like. However, where a reactant, as exemplified by methylene dibromide, is itself a liquid at reaction temperatures, the use of a solvent or diluent is conveniently omitted entirely.

To provide a usefully mobile reaction mixture when methylene dibromide is reacted with triphenylphosphine in the absence of other solvents, about two moles of the methylene dibromide are needed per mole of the phosphine. At this ratio, about twice as much of the monophosphonium monobromide is produced as methylene bis-(triphenylphosphonium bromide). Variation in the ratios of methylene dihalide to phosphine will affect the proportions of monohalide to dihalide in the resulting reaction products; in general, monohalide product will be produced along with the dihalide even at a 1:1 molar ratio of the reactants, and even lower ratios, such as 1 mole of methylene dihalide to 3 of phosphine, may result in mixed reaction products to which the one-step conversion and separation method of this invention is conveniently applied.

In the one-step conversion and separation method of the invention, a solution of a mixture comprising essentially an alkylphosphonium halide and a methylene diphosphonium dihalide is passed through a bed of solid basic chromatographic adsorbent. The solvent used to dissolve this mixture will suitably be the least polar available fluid with solvent power for the methylene diphosphonium dihalide; generally, halohydrocarbons such as methylene dichloride, or methylene dibromide will be useful for this purpose.

By a chromatographic adsorbent is meant a solid adsorbent of the general type discussed in Chapters VIII and IX of Cassidy, "Fundamentals of Chromatography" (Interscience, 1957). These adsorbents include inorganic products such as alumina, and synthetic adsorbents such as ion exchange resins. For the present purposes, useful adsorbents are the basic reacting materials: an adsorbent as acidic as silica gel is unsuitable, but an alumina characterized as "neutral," as explained above, having a pH of 7.5, is eminently suitable, so that the alkalinity of the adsorbent need not be very great. An ion exchange resin which is a weak base, having amine groups as substituents, is also effective.

Exemplary of presently useful inorganic basic adsorbents are alumina, magnesia, manganese dioxide, barium carbonate, calcium carbonate, calcium hydroxide, chromic hydroxide, and the like. Organic natural adsorbents may be washed with alkali to make them basic and employed for the present purposes as basic adsorbents; illustrative of solid adsorbents which can be used thus are cellulosic products such as filter paper or other purified wood celluloses, starch, sugar, and so forth.

A further class of presently useful adsorbents comprises the adsorbent basic ion exchange resins. As is known in the art, these are polymeric structures including basic nitrogenous, amine groups in the polymer molecule; most frequently, the polymeric structure is polystyrene crosslinked with divinylbenzene, which is chloromethylated and then aminated, to introduce an aminomethyl group on the benzene ring of the styrene residue. Using ammonia, a primary, secondary or tertiary amine to effect the amination produces successively more strongly basic resins. The amino substituent is initially formed as the hydrochloride or quaternary chloride, and washing or treatment with alkali produces the basic form of the resin. Suitable amines for amination include, for example, trimethylamine, benzyldimethylamine, hydroxyethyldimethylamine, and the like. Other kinds of anionic ion exchange resins can also be used: for example, an amine group can be put on cross-linked polystyrene by nitrating the polymer and then reducing the nitro group, an amino-substituted resin can be made by condensing m-phenylenediamine with formaldehyde, a polyethyleneimine can be cross-linked with epichlorohydrin to provide a resin, and so forth. The procedures for making these anionic ion exchange resins are well known in the art. The high porosity resins, with a surface area of 40–70 square meters per gram of resin, 25–60% porosity, are particularly adapted to adsorb organic materials from nonaqueous organic solutions, and are preferred in the present connection. As discussed above, weakly basic adsorbents are quite effective in the present connection, and the resins used need not be in the strongly basic, quaternary ammonium hydroxide form, but may and preferably will be only slightly alkaline, between pH 7.0 and 8.0, for example, with amine groups or with quaternary ammonium groups chiefly in the chloride salt form, for example, or washed with sodium bicarbonate to make them weakly basic.

Treatment of the mixture of phosphonium halides with the basic adsorbent is conducted as usual in chromatographic separation. The adsorbent is used in particulate form, packed in a bed open at top and bottom, which is usually desirably tall and narrow in shape, to maximize the travel path of the fluid mixture being treated. It is desirable to wet the adsorbent initially with the same solvent as will be used to provide the solution of the phosphonium salt mixture. Then the solution of the mixture is introduced into the bed of adsorbent. The ratio of weight of phosphonium salt to weight of adsorbent will be maximized to the extent consistent with effective separation, for the sake of economy, but usually will be in the range of 1 part of phosphonium salt mixture to at least 5 parts of adsorbent.

As the phosphonium salt mixture passes into the adsorbent bed, the monophosphonium halide salt will be adsorbed and retained in the initial part of the bed, while the methylene diphosphonium dihalide will be dehydrohalogenated to the phosphonium methylene phosphorane halide.

Addition of the solution of the mixture to the bed of adsorbent is now followed by addition of an eluting solvent. This may be the same as the solvent used to prepare the solution of the mixture, or where this is ineffective to displace the mesomeric salt from the adsorbent, a mixture of it with a minor amount of a more polar solvent, higher in the eluotropic series, may be used. (For the eluotropic series, see p. 251, H. G. Cassidy, "Fundamentals of Chromatography," Interscience, 1957.) To avoid unselective desorption of all the phosphorus compounds present from the adsorbent, the amount of more powerfully eluting solvent used should be minimized as far as possible: for example, in using a mixture of methanol with methylene dichloride, the methanol is usually advantageously 5% or less of the total volume.

The eluate issuing from the bed will be a solution of the desired mesomeric phosphorane salt, from which the salt can be recovered by usual means such as evaporating off the solvent. If desired, the other organophosphorus compounds left in the adsorbent bed can subsequently also be removed from the bed, by elution with solvents higher in the eluotropic series than that used to elute the mesomeric salt, such as mixtures of methanol and methylene dichloride, or methanol itself; the adsorbent can be regenerated by washing with aqueous base such as sodium bicarbonate, sodium hydroxide, or the like; and the above-described operations can be conducted in a batch or continuous manner. A moving bed of adsorbent can be used; the adsorbent can be immersed in the solution of the mixture, in an open container, and then withdrawn to leave behind the phosphorane salt in the solvent; and, similarly, other commercially operable procedures for conducting adsorption processes can be employed.

The invention is illustrated, but not limited, by the following examples, in which all temperatures are degrees C.

*Example 1*

This example illustrates reaction of a tri-substituted phosphine with an alkylidene dihalide to provide a mixture of alkyl monophosphonium monohalides and an alkylidene diphosphonium dihalide.

A reaction flask is charged with 52.6 grams (g.) (0.2 mole) of triphenylphosphine, 69.6 g. (0.4 mole) of methylene dibromide is added to this under nitrogen, and the mixture is stirred and refluxed for 3 hours. The reaction mixture after cooling to room temperature is dark and viscous. Trituration of this reaction mass with 200 milliliters (ml.) of diethyl ether causes separation of thick, sticky matter, which is further stirred, rubbed and triturated with fresh ether until it is completely converted to a powder. The powder is filtered off and dried overnight under a vacuum of 20 millimeters (mm.) Hg. The weight is then 77 g.; 75 g. of this is dissolved in 50 ml. of warm methanol and the resulting solution is filtered. Addition of 200 ml. of ethyl acetate to the orange-brown filtrate produces separation of a flocculent precipitate, which is filtered off, washed with ethyl acetate, and air-dried. This provides 17.3 g. of methylene bis(triphenylphosphonium bromide), M.P. 297–300° C.

The methanol-ethyl acetate filtrate from the stated precipitation procedure is evaporated down to remove the solvent. The residue is let stand under ethyl acetate for several days, heated with ethyl acetate and rubbed with ether, and finally dissolved in a minimum amount of warm methanol. Addition of three volumes of ethyl acetate produces precipitation of 18.7 g. of (bromomethyl)triphenylphosphonium bromide as white crystals, M.P. 195–225° C. Identity of the monobromide is confirmed by infrared analysis.

The filtrate from which the stated monobromide is separated is now treated by addition of ethyl acetate, which precipitates 12.6 g. of a tan solid. This is identified by infrared analysis as methyltriphenylphosphonium bromide, complexed with methanol.

*Example 2*

This example describes simultaneous dehydrohalogenation of a methylene diphosphonium dihalide and separation of the product from a halomethylphosphonium halide admixed with the dihalide.

The solvent is evaporated off, at 50° C./20 mm., from a methanol solution of a synthetic mixture of methylene bis(triphenylphosphonium bromide) and (bromomethyl)-triphenylphosphonium bromide, in the ratio of 20 g. to 35 g., respectively. The resulting gum is triturated with three 500 ml. portions of ether to provide a powder which is filtered off and dried. One gram of this powder is dissolved in 6 ml. of methylene dichloride, providing a solution which is poured onto a glass cylindrical column, 6.5 by 0.5 inches, packed with 14.3 g. of 80–200 mesh chromatography grade MCB neutral alumina (pH 7.5). Now, 100 ml. of methylene dichloride is poured onto the column. The resulting eluate is evaporated to dryness, leaving a white solid. Washing with ether and drying gives 0.32 g. of product comprising triphenylphosphonium methylenetriphenylphosphorane bromide, M.P. 217–271° C.

Putting another 50 ml. of methylene dichloride through the column provides an eluate containing a further small amount of the same product. Successive 50 ml., 25 ml. and 25 ml. portions of methylene dichloride fail to produce any further displacement of non-volatile organic compounds from the adsorbent. A 10% methanol-90% methylene dichloride mixture is now introduced, and the resulting eluate evaporated to dryness. This provides 0.40 g. of white solid product, M.P. 213–220°, which comprises (bromomethyl)triphenylphosphonium bromide.

*Example 3*

This example describes another dehydrohalogenation and separation on a fixed bed of adsorbent.

A column is packed with 10 g. of the alumina described in Example 2. A solution of 1 g. of mixed methylene bis(triphenylphosphonium bromide) and (bromomethyl) triphenylphosphonium bromide, in a 20:35 weight ratio, in 6 ml. of methylene dichloride, is put on the column. Addition of 25 ml. of methylene dichloride produces an eluate which is evaporated to dryness to provide 0.28 g.

of white solid, M.P. 268–270° C., comprising triphenylphosphonium methylenetriphenylphosphorane bromide.

Putting a second 25 ml. portion of methylene dichloride with the column produces an eluate containing additional triphenylphosphonium methylenetriphenylphosphorane bromide. The next addition of 25 ml. methylene dichloride produces an eluate providing only 0.03 g. residue, and the column is next treated with 25 ml. of a 10/90 methanol/methylene dichloride mixture. The resulting eluate residue weighs 0.40 g. and is a white solid, M.P. 228–230°, which is substantially pure (bromomethyl)triphenylphosphonium bromide.

*Example 4*

This example illustrates treatment of a reaction product to recover a mesomeric phosphonium halide in accordance with this invention.

A one gram portion of the reaction product prepared as described in Example 1 from methylene dibromide and triphenylphosphine, reserved from the material worked up to isolate the individual products in the reaction mixture as described in Example 1, is dissolved in 6 ml. of methylene dichloride. The resulting solution is poured onto a column packed with neutral alumina, as described in Example 2. The column is eluted with 35 ml. of a 5/95 methanol/methylene dichloride mixture, giving an eluate which is evaporated to dryness and triturated with ethyl acetate to recover 0.31 g. of product comprising triphenylphosphonium methylenetriphenylphosphorane bromide, M.P. 257–266° (corr.) after recrystallization from isopropanol with ethyl acetate and drying. Continued elution with the 5/95 methanol mixture displaces methyltriphenylphosphonium bromide from the column.

*Example 5*

This example illustrates use of a more strongly basic adsorbent.

The procedure of Example 4 is repeated, but replacing the column packing with 14.3 g. of basic (pH 10) alumina, activity grade 1 (Brockmann, Ber. 74 (1941), 73). Elution with 125 ml. of methylene dichloride produces an eluate which is evaporated off to leave a yellow gum. Rubbing with hot ethyl acetate converts this to a powder comprising triphenylphosphonium methylenetriphenylphosphorane bromide and weighing 0.23 g. Subsequent elution with 150 ml. of methanol displaces methyltriphenylphosphonium bromide from the column.

*Example 6*

This example illustrates use of a weakly basic ion exchange resin to effect recovery of a phosphonium methylenephosphorane halide.

A column 8.5 by 1 inch radius is packed with 50 g. of anion exchange resin having quaternary ammonium chloride substituents, in the form of 0.4–0.5 mm. beads with 25–40% porosity, 200–600 A. average pore diameter, 40–50 square meter per gram surface area. The alkalinity of this resin, measured by titration with HCl, is less than 0.2 meq./g. The column of water-moist resin is conditioned by passing 2.5 bed volumes of methylene dichloride through the packed resin. A solution of 3 g. of a mixture of 2 parts (chloromethyl)triphenylphosphonium chloride to 1 part by weight of methylene bis-triphenylphosphonium chloride) in 30 ml. of methylene dichloride is then put into the top of the column, and the column is allowed to drain. Evaporation of the drainings to dryness provides substantially pure triphenylphosphonium methylenetriphenylphosphorane chloride.

While the invention has been illustrated with reference to specific preferred embodiments thereof, it is to be appreciated that modifications and variations can be made without departing from the scope of the invention, which is limited only as described in the appended claims.

What is claimed is:
1. The method of producing a phosphonium methylenephosphorane halide which comprises passing a solution of a mixture of an alkylphosphonium halide and a methylene diphosphonium dihalide into a bed of a solid basic chromatographic adsorbent and eluting the adsorbent bed.

2. The method of producing a phosphonium methylenephosphorane halide which comprises the steps of reacting an alkylidene dihalide with a tri-substituted phosphine to provide a mixture of an alkylphosphonium halide and a methylene diphosphonium dihalide, passing a solution of said mixture in a halohydrocarbon solvent into a bed of adsorbent, and eluting the phosphonium methylene phosphorane halide from said bed.

3. The method of claim 1 in which said adsorbent is alumina having a pH of between 7.0 and 8.0.

4. The method of claim 2 in which said adsorbent is alumina having a pH of between 7.0 and 8.0.

5. The method which comprises passing a mixture of a methylene bis(triphenylphosphonium halide) and at least one alkylphosphonium halide selected from the class consisting of (1-haloalkyl)triphenylphosphonium halides and hydrocarbyltriphenylphosphonium halides into a bed of a solid basic chromatographic adsorbent, and eluting the bed.

6. The method of producing triphenylphosphonium methylenetriphenylphosphorane bromide which comprises passing a methylene dihalide solution of a mixture of methylene bis(triphenylphosphonium bromide) and at least one alkyl triphenylphosphonium bromide selected from the class consisting of (bromomethyl)triphenylphosphonium bromide and methyltriphenylphosphonium bromide into a bed of a solid basic chromatographic adsorbent and eluting triphenylphosphonium methylenetriphenylphosphorane bromide from said bed by addition of an eluent comprising a methylene dihalide to said bed.

7. The method of claim 6 in which said adsorbent is alumina having a pH of between 7.0 and 8.0.

8. The method of producing triphenylphosphonium methylenetriphenylphosphorane bromide which comprises reacting methylene dibromide with triphenylphosphine to form a reaction product containing methylene bis(triphenylphosphonium bromide), passing a solution of said reaction product in methylene dichloride into a bed of solid basic chromatographic adsorbent, and eluting said bed with methylene dichloride containing up to about 5% methanol.

9. The method of claim 8 in which said adsorbent is alumina.

10. The method of claim 9 in which said adsorbent is alumina having a pH of between 7.0 and 8.0.

References Cited

UNITED STATES PATENTS 3,262,971   7/1966   Matthews _____ 260—606.5 X

HELEN M. McCARTHY, *Primary Examiner.*

W. F. W. BELLAMY, *Assistant Examiner.*